United States Patent
Kim

(10) Patent No.: US 7,454,189 B2
(45) Date of Patent: *Nov. 18, 2008

(54) CALIBRATION OF RECEIVED SIGNAL STRENGTH INDICATION

(75) Inventor: Hea Joung Kim, El Segundo, CA (US)

(73) Assignee: Broadcom Corporation, Irvine, CA (US)

( * ) Notice: Subject to any disclaimer, the term of this patent is extended or adjusted under 35 U.S.C. 154(b) by 759 days.

This patent is subject to a terminal disclaimer.

(21) Appl. No.: 10/973,178

(22) Filed: Oct. 26, 2004

(65) Prior Publication Data

US 2005/0059367 A1    Mar. 17, 2005

Related U.S. Application Data

(63) Continuation of application No. 10/255,402, filed on Sep. 26, 2002, now Pat. No. 6,829,550.

(51) Int. Cl.
*H04B 1/28*    (2006.01)

(52) U.S. Cl. .................. 455/333; 455/115.3; 455/226.3; 455/250.1; 375/346

(58) Field of Classification Search .................. 455/323, 455/333, 115.1–115.3, 226.1–226.3, 334, 455/161.1–161.3, 232.1, 240.1, 250.1, 127.1, 455/127.2, 343.1, 343.2; 375/238, 345, 346, 375/320, 327

See application file for complete search history.

(56) References Cited

U.S. PATENT DOCUMENTS

| 6,560,463 | B1 * | 5/2003 | Santhoff | 455/522 |
| 6,915,114 | B2 * | 7/2005 | Khorram | 455/67.14 |
| 7,054,603 | B2 * | 5/2006 | Khorram | 455/234.1 |
| 7,151,759 | B1 * | 12/2006 | Ryan et al. | 370/332 |
| 7,299,021 | B2 * | 11/2007 | Parssinen et al. | 455/226.1 |
| 2004/0198286 | A1 * | 10/2004 | Khorram | 455/234.1 |

* cited by examiner

*Primary Examiner*—Edward Urban
*Assistant Examiner*—Nhan T. Le
(74) *Attorney, Agent, or Firm*—Garlick Harrison & Markison; Timothy W. Markison

(57) ABSTRACT

Calibration of received signal strength indication (RSSI) within a radio frequency integrated circuit (RFIC) begins by concurrently enables a transmitter portion and receiver portion. With both the transmitter and receiver enabled, the RFIC provides a zero input to the transmitter portion, where the zero input is an effective zero input based on the input circuitry of the transmitter portion. The RFIC then measures, via the receiver portion, the received signal strength of the RF signal generated by the transmitter portion regarding the zero input signal. The RFIC then compares the measured received signal strength with a desired zero input signal strength value. If the measured received signal strength compares unfavorably with the desired zero input signal strength value (e.g., differ by more than a few percentage points), the received signal strength to power level table within the RFIC, which is used to convert a measured voltage into a dBm value, is scaled based on the difference between the measured received signal strength and the desired zero input signal strength value.

9 Claims, 5 Drawing Sheets

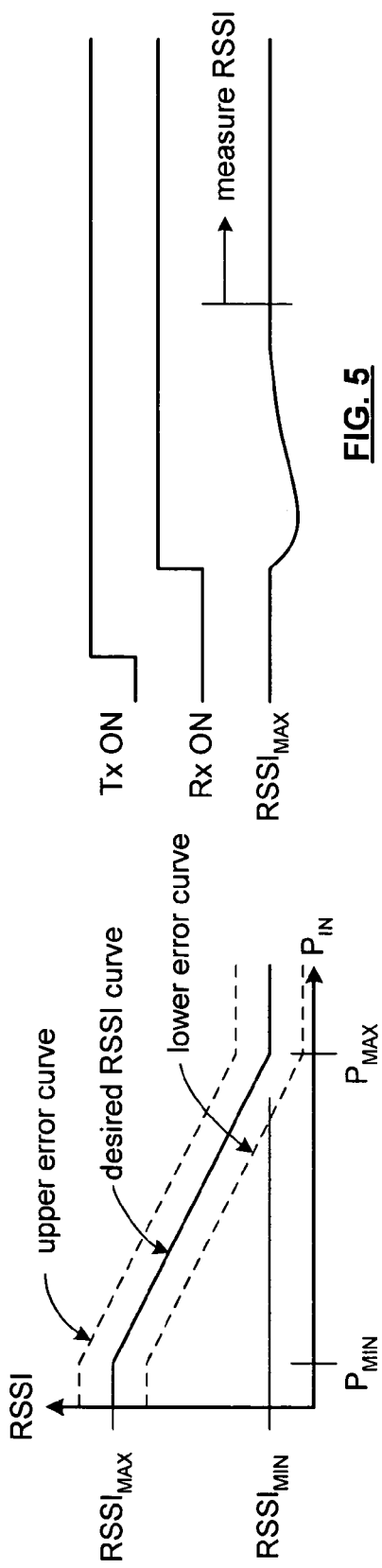
FIG. 4
FIG. 5
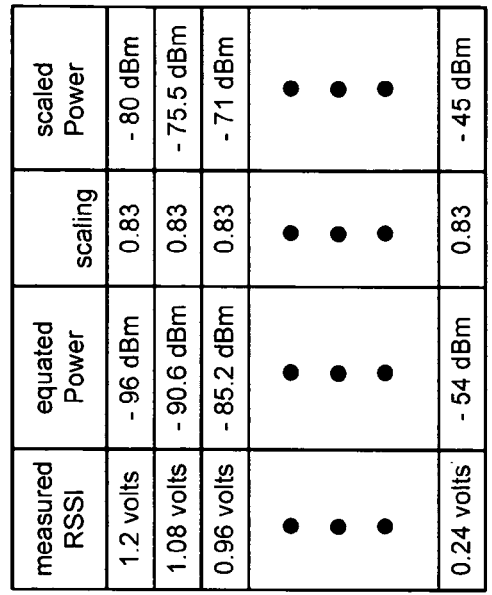
FIG. 6
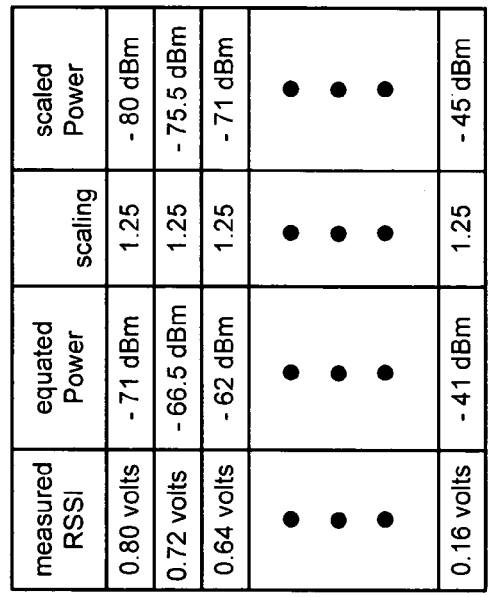
FIG. 7
FIG. 8

CALIBRATION OF RECEIVED SIGNAL STRENGTH INDICATION

This patent application is claiming priority under 35 USC § 120 as a continuing patent application of patent application entitled Calibration of Received Signal Strength Indication Within A Radio Frequency Integrated Circuit having a Ser. No. of 10/255,402 and a filing date of Sep. 26, 2002 now U.S. Pat. No. 6,829,550.

BACKGROUND OF THE INVENTION

1. Technical Field of the Invention

This invention relates generally to wireless communication systems and more particularly to radio frequency integrated circuits used within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Many of the components of the transmitter and receiver are adjustable to account for process variations as well as for differing power levels of received radio frequency (RF) signals and/or of varying power levels of transmitted RF signals. To adjust for differing levels of received RF signals, the radio receiver includes a received signal strength indication (RSSI) module. As is known, a received signal strength indication module measures the magnitude of a received signal (i.e., in voltage), which is converted into a corresponding power level (in dBm, which is the ratio of power in milliwatts). For radio frequency integrated circuits that include an integrated RSSI module, the RSSI module is subject to the same process variations as other components of the RFIC. As such, the measured RSSI value may be off by as much as 20%. In high performance applications, this error is unacceptable since, if the measured RSSI is skewed high due to process variations (e.g., RSSI value greater than corresponding desired power level), useable RF signals will be ignored. Conversely, when the process variations skews the measured RSSI low, the radio will believe it is receiving an RF signal when in fact it is not. This later case locks the radio in the receive mode.

Such RFICs are generally tested prior to incorporation into a wireless communication device such that RFICs that exhibit the above mentioned process variation errors are discarded. By discarding otherwise useable RFICs for process variations of the RSSI module, manufacturing costs increase, which causes a domino effect of increased costs for wireless communication equipment and services.

Therefore, a need exists for a method and apparatus for calibrating received signal strength indication within a radio frequency integrated circuit.

BRIEF SUMMARY OF THE INVENTION

The calibration of received signal strength indication (RSSI) within a radio frequency integrated circuit (RFIC) of the present invention substantially meets these needs and others. In an embodiment of the present invention a RFIC concurrently enables a transmitter portion and receiver portion. With both the transmitter and receiver enabled, the RFIC provides a zero input to the transmitter portion, where the zero input is an effective zero input based on the input circuitry of the transmitter portion. The RFIC then measures, via the receiver portion, the received signal strength of the RF signal generated by the transmitter portion regarding the zero input signal. The RFIC then compares the measured received signal strength with a desired zero input signal strength value. If the measured received signal strength compares unfavorably with the desired zero input signal strength value (e.g., differ by more than a few percentage points), the received signal strength to power level table within the RFIC, which is used to convert a measured voltage into a dBm value, is scaled based on the difference between the measured received signal strength and the desired zero input signal strength value.

By scaling the received signal strength to power level table, RFICs that previously would have been discarded for failing the RSSI test, now are usable in wireless communication devices. As such, manufacturing costs may be decreased which in turn decrease the costs of wireless communication devices and corresponding services.

BRIEF DESCRIPTION OF THE SEVERAL VIEWS OF THE DRAWINGS

FIG. 4 is a graph plotting received signal strength indication versus power in accordance with the present invention;

FIG. 5 is a timing diagram for the concurrent enablement of the transmitter section and receiver section in accordance with the present invention;

FIG. 6 is a table corresponding the desired RSSI value to power level in accordance with the present invention;

FIG. 7 is a modified RSSI value to power table in accordance with the present invention;

FIG. 8 is an alternate table of adjusted RSSI values in accordance with the present invention.

DETAILED DESCRIPTION OF A PEREFERRED EMBODIMENT

Figure 1:
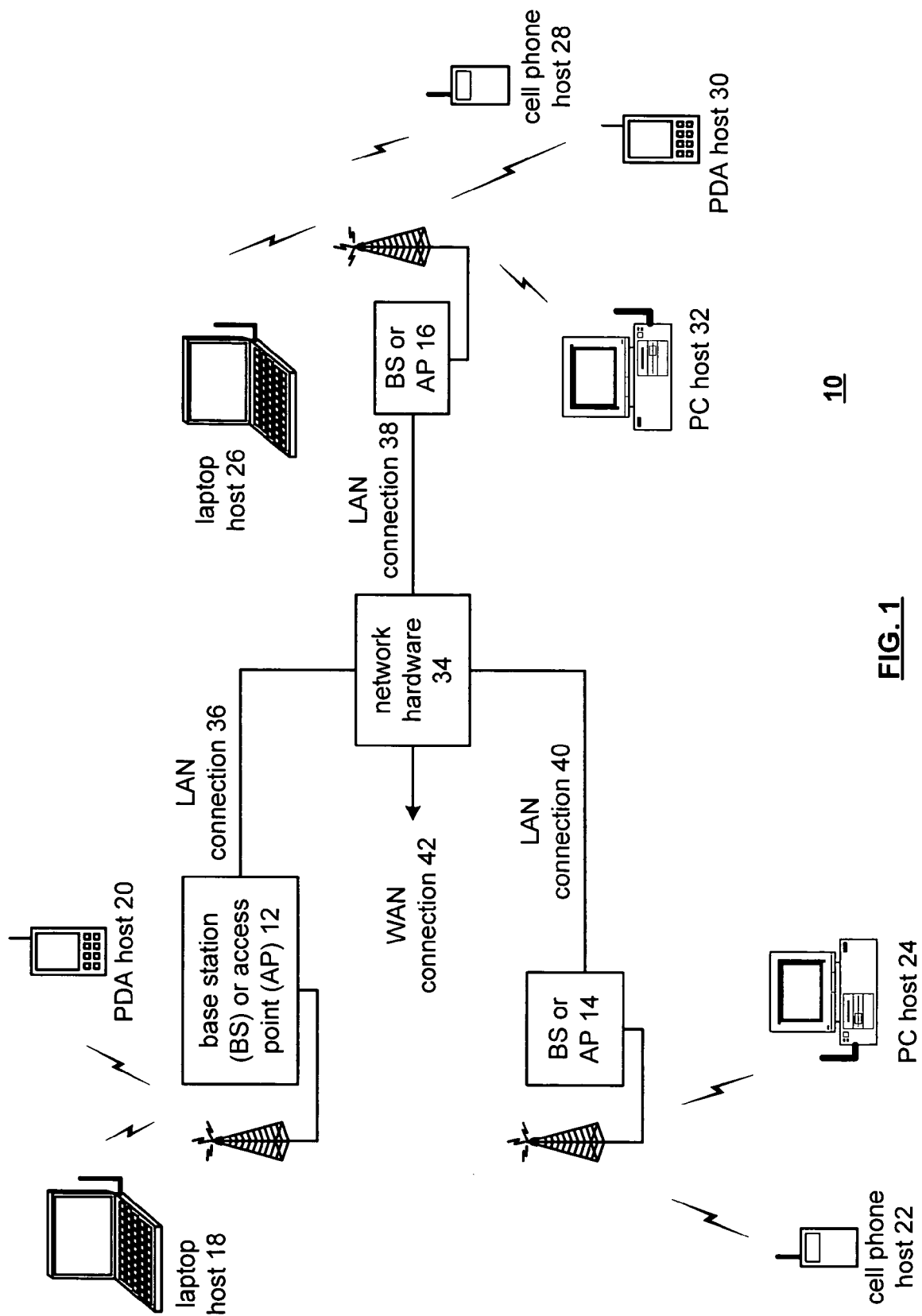
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
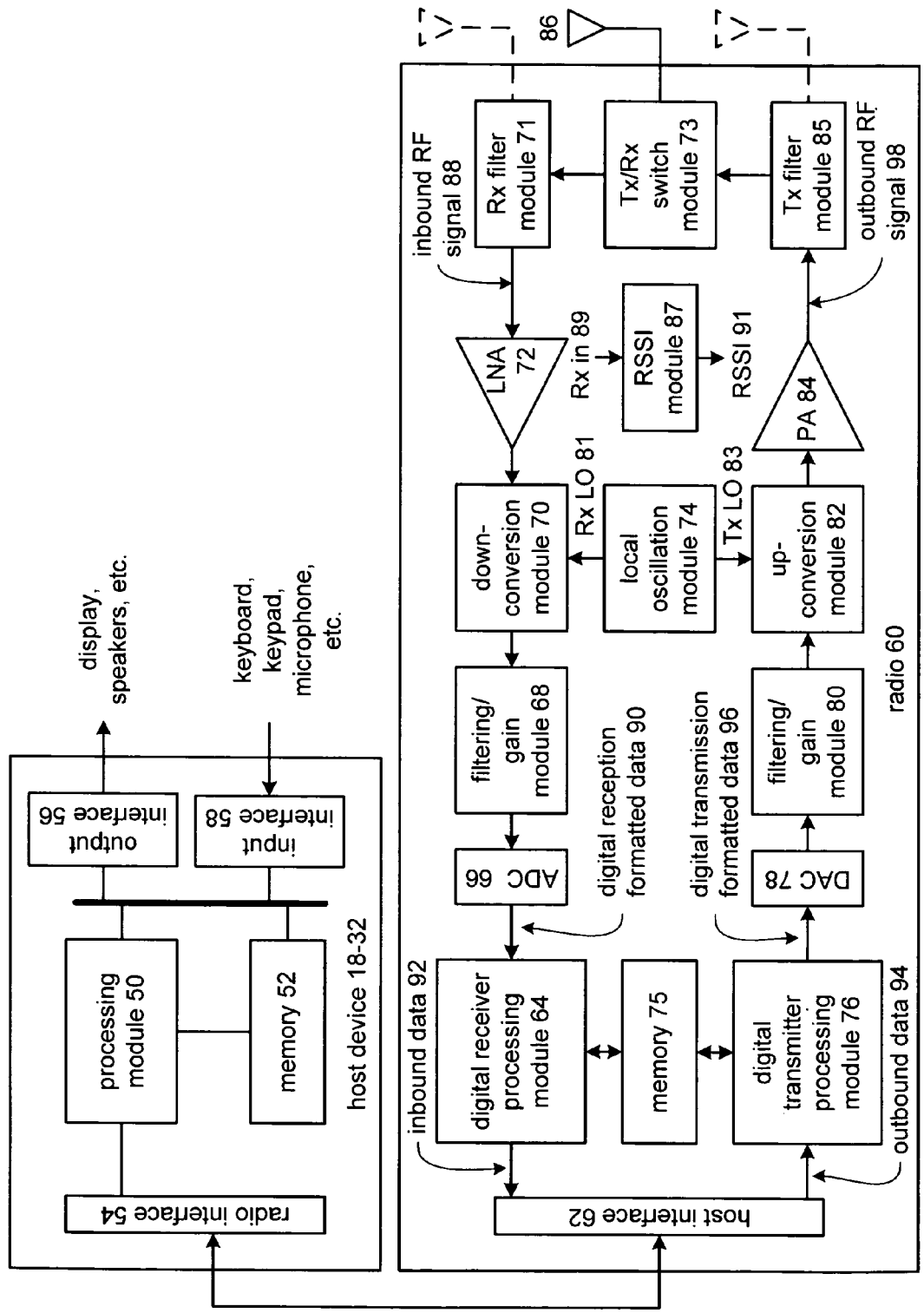
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a received signal strength indication (RSSI) module 87, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal. The RSSI module 87 measures the RSSI 91 of the received signal 89, which may be the output of the LNA 72, the output of the down-conversion module 70, the digital reception formatted data 90, the inbound data 92, or intermediaries thereof.

The analog-to-digital converter 66 converts the filtered inbound signal from the analog domain to the digital domain to produce digital reception formatted data 90. The digital receiver processing module 64 decodes, descrambles, demaps, equalizes channel response, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
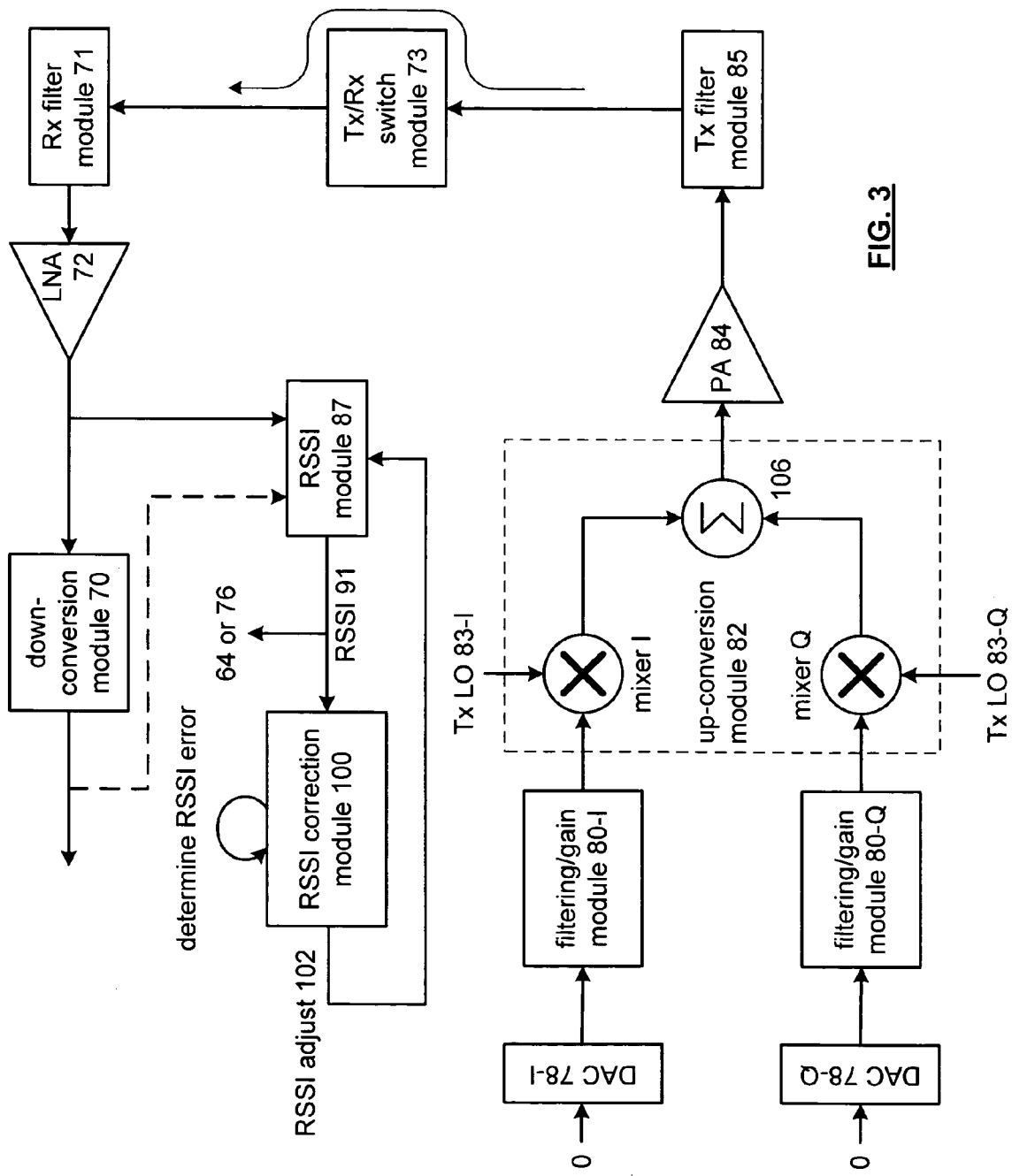
FIG. 3 is a schematic block diagram of a transmitter portion and receiver portion of the radio of FIG. 2.

FIG. 3 is a schematic block diagram of the transmitter portion and receiver portion of radio 60. The transmitter portion includes digital-to-analog converters (DACs 78-I and 78-Q) filter/gain modules 80-I and 80-Q, the up-conversion module 82, power amplifier 84 and the transmit filter module 85. The receiver portion includes the receiver filter module 71, low noise amplifier 72, down-conversion module 70, RSSI module 87 and RSSI correction module 100. The RSSI correction module 100 may be in processing module 64 and/or processing module 76.

In calibration mode, the inputs to the digital-to-analog converters 78-I and 78-Q are provided with a zero input value. The zero input value will correspond to the voltage range of the digital-to-analog converters. For example, if the input range is from zero volts to 1.8 volts, where zero volts corresponds to a maximum negative value and 1.8 volts corresponds to the maximum positive value, a nominal value of 0.9 will correspond to the zero input. The digital-to-analog converters 78-I and 78-Q convert the zero input signals from the digital domain to the analog domain. The analog signals are filtered via the filter/gain modules 80-I and 80-Q.

The up-conversion module 82 includes mixer I, mixer Q and a summing module 106. Mixer I mixes the filtered zero input I component with an I component of the transmit local oscillation 83-I. Mixer Q mixes the filtered zero input Q component with the Q component of the transmit local oscillation 83-Q. The mixed signals are summed via summer 106 to produce an RF signal. The power amplifier amplifies the RF signal and provides it to the transmit/receive switch module 73 via the transmit filter module 85.

The receiver filter module 71 receives the RF signal of the zero input, filters it and provides it to the low noise amplifier 72. The low noise amplifier amplifies the RF signal and provides it to down-conversion module 70. The down-conversion module 70 recaptures the baseband signal corresponding to the effective zero inputs.

The RSSI module 87 measures the signal strength of the received RF signal during calibration mode either at the output of the low noise amplifier 72, after the signal has been converted to baseband, or during data extraction. In any configuration, the RSSI module 87 produces an RSSI value 91 of the received RF signal. The RSSI value 91 may be provided to the RSSI correction module 100 and/or to the processing module 64 and/or 76.

The RSSI correction module 100 receives the RSSI value 91 and compares it with a desired zero input RSSI value. Based on this comparison, the RSSI correction module 100 produces an RSSI adjust signal 102, which may be fed back to the RSSI module 87 and/or used to update a RSSI/power level table stored in the radio. The determination of the RSSI error, the RSSI adjust value 102, and the correction therefore will be described in greater detail with reference to FIGS. 4-9.

FIG. 4 is a graph plotting RSSI values versus input power. As shown, the desired RSSI curve is showed in a solid line where the maximum RSSI value corresponds to the minimum input power and the minimum RSSI value corresponds to the maximum input power. As one of average skill in the art will appreciate, the RSSI to power input may be directly proportional such that the maximum RSSI value corresponds with the maximum input power.

The graph of FIG. 4 further illustrates an upper error curve and a lower error curve, which are produced as a result of process variations in the fabrication of the radio 60. As such, at a particular input power, the RSSI value may range from the lower error curve to the upper error curve providing an erroneous RSSI value. Such an erroneous RSSI value may lock the radio in the receive mode or may cause the radio to miss processing a valid inbound RF signal.

FIG. 5 is a timing diagram illustrating the concurrent activation of the transmitter section and receiver section. As shown, after some settling time of the RSSI value, the RSSI value is measured. The settling time corresponds to the activation and stabilization of self-correcting circuitry within the radio to compensate for LO leakage, DC offset, frequency offset, et cetera.

FIG. 6 illustrates a table corresponding RSSI values to power levels. With reference to FIG. 4, the maximum RSSI value corresponds to 1 volt, which in turn relates to a minimum input power of −80 dBm. As the RSSI value decreases in voltage, the input power increases. For the table of FIG. 6, the minimum RSSI value of 0.2 volts corresponds to a maximum input power of −45 dBm.

FIG. 7 illustrates an example of a table that is scaled when the RSSI to power level corresponds to the lower error curve. In this instance, at minimum input power, which corresponds to the zero input signal, the measured RSSI value is 0.8 volts. According to the desired RSSI curve, 0.8 volts corresponds to a −71 dBm signal. However, since it is known that the 0.8 volt is generated for minimum power due to the zero input calibration test, a scaling factor of 1.25 is determined such that the scaled power is −80 dBm. All other measured RSSI values are scaled by the same scaling factor as determined for the zero input case.

FIG. 8 illustrates an example of a table corresponding to the upper error curve of FIG. 4. In this instance, when the zero input signal was received, a measured RSSI value of 1.2 volts was obtained. If this were equated to the power of the desired RSSI curve it would have a power level of −96 dBm. Since it was generated with a zero input, the desired power is −80 dBm thus, a scaling factor of 0.83 is determined. The other measured RSSI values are scaled based on the same scaling value to produce the desired power levels for the measured RSSI values.

Figure 9:
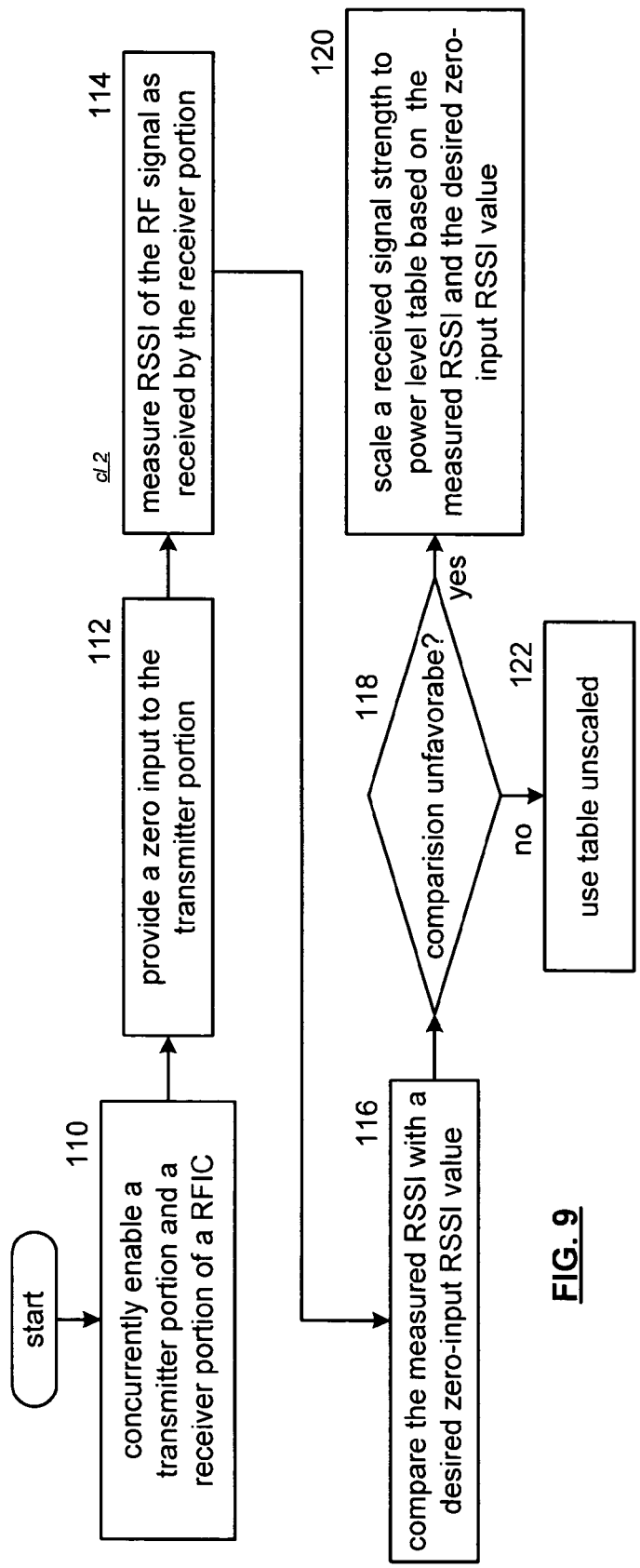
FIG. 9 is a logic diagram of a method for calibrating received signal strength indication within a radio frequency integrated circuit in accordance with the present invention.

FIG. 9 is a logic diagram of a method for calibrating received signal strength indications within a radio frequency integrated circuit. The process begins at Step 110 where a transmitter portion and receiver portion of a radio frequency integrated circuit are concurrently enabled. The process then proceeds to Step 112 where a zero input is provided to the transmitter portion. The transmitter portion up-converts the zero input signal via a mixer section to produce a radio frequency signal. The zero input is an effective zero input depending on the input circuitry of the receiver. This was described in greater detail with reference to FIG. 3.

The process then proceeds to Step 114 where the RSSI value of the RF signal is measured via the concurrently enabled receiver portion. This may be done by obtaining one sample or a plurality of samples and averaging the plurality of samples to determine an average sample. The process then proceeds to Step 116 where the measured RSSI value is compared with a desired zero input RSSI value. The process then proceeds to Step 118 where a determination is made as to whether the comparison was favorable (e.g., the measured RSSI value is substantially similar to the desired RSSI value for a zero input). If the comparison was unfavorable, the process proceeds to Step 120 where a received signal strength to power level table is scaled based on the difference between the measured RSSI value and the desired zero input RSSI value. The scaling may be up or down as described in the examples of FIG. 7 and FIG. 8. If the comparison was favorable, the process proceeds to Step 122 where the table is used unscaled.

The preceding discussion has presented a method and apparatus for calibrating a received signal strength indication within a radio frequency integrated circuit. By calibrating the RSSI module, yield of RFICs is enhanced since parts that would have failed previous tests now can be calibrated to pass the tests and to provide reliable infield use. As one of average skill in the art will appreciate, other embodiments may be derived from the teachings of the present invention, without deviating from the scope of the claims.

What is claimed is:

1. A method for calibrating received signal strength indication within a radio frequency integrated circuit (RFIC), the method comprises:
concurrently enabling a transmitter portion of the RFIC and a receiver portion of the RFIC;
providing a zero input to the transmitter portion, wherein the transmitter portion up converts the zero input via a mixer section to produce a radio frequency (RF) signal;
measuring received signal strength of the RF signal as received by the receiver portion while the transmitter portion and receiver portion are concurrent enabled to produce a measured received signal strength;
comparing the measured received signal strength with a desired zero-input signal strength value; and
when the measured received signal strength compares unfavorably to the desired zero-input signal strength value, scaling a received signal strength to power level table based on a difference between the measured received signal strength and the desired zero-input signal strength value.

2. The method of claim 1, wherein the measuring the received signal strength of the RF signal further comprises:
sampling a received signal strength indication to produce a plurality of samples after expiration of a predetermined period of time to allow DC offset and local oscillation leakage correction circuits to settle; and
calculating the measured received signal strength from the plurality of samples.

3. The method of claim 1 further comprises:
determining whether the measured received signal strength is greater than the desired zero-input signal strength value;
when the measured received signal strength is greater than the desired zero-input signal strength value, scaling up values in the received signal strength to power level table; and
when the measured received signal strength is less than the desired zero-input signal strength value, scaling down values in the received signal strength to power level table.

4. An apparatus for calibrating received signal strength indication within a radio frequency integrated circuit (RFIC), the apparatus comprises:
processing module; and
memory operably coupled to the processing module, wherein the memory includes operational instructions that cause the processing module to:
concurrently enable a transmitter portion of the RFIC and a receiver portion of the RFIC;
provide a zero input to the transmitter portion, wherein the transmitter portion up converts the zero input via a mixer section to produce a radio frequency (RF) signal;
measure received signal strength of the RF signal as received by the receiver portion while the transmitter portion and receiver portion are concurrent enabled to produce a measured received signal strength;
compare the measured received signal strength with a desired zero-input signal strength value; and
when the measured received signal strength compares unfavorably to the desired zero-input signal strength value, scale a received signal strength to power level table based on a difference between the measured received signal strength and the desired zero-input signal strength value.

5. The apparatus of claim 4, wherein the memory further comprises operational instructions that cause the processing module to measure the received signal strength of the RF signal by:
sampling a received signal strength indication to produce a plurality of samples after expiration of a predetermined period of time to allow DC offset and local oscillation leakage correction circuits to settle; and
calculating the measured received signal strength from the plurality of samples.

6. The apparatus of claim 4, wherein the memory further comprises operational instructions that cause the processing module to:
determine whether the measured received signal strength is greater than the desired zero-input signal strength value;
when the measured received signal strength is greater than the desired zero-input signal strength value, scale up values in the received signal strength to power level table; and
when the measured received signal strength is less than the desired zero-input signal strength value, scale down values in the received signal strength to power level table.

7. A radio frequency integrated circuit (RFIC) comprises:
transmitter section operably coupled to convert outbound data into outbound radio frequency (RF) signals;
receiver section operably coupled to convert inbound RF signals into inbound data;
received signal strength indicator operably coupled to measure signal strength of the inbound RF signals to produce a measured signal strength; and
calibration module operably coupled to calibrate the measured signal strength by:
concurrently enabling the transmitter section and the receiver section;
providing a zero input to the transmitter section, wherein the transmitter section up converts the zero input via a mixer section to produce the outbound RF signal;
measuring received signal strength of the outbound RF signal as received by the receiver section while the transmitter section and receiver section are concurrent enabled to produce a measured received signal strength;
comparing the measured received signal strength with a desired zero-input signal strength value; and
when the measured received signal strength compares unfavorably to the desired zero-input signal strength value, scaling a received signal strength to power level table based on a difference between the measured received signal strength and the desired zero-input signal strength value.

8. The RFIC of claim 7, wherein the measuring the received signal strength of the RF signal further comprises:
sampling a received signal strength indication to produce a plurality of samples after expiration of a predetermined period of time to allow DC offset and local oscillation leakage correction circuits to settle; and
calculating the measured received signal strength from the plurality of samples.

9. The RFIC of claim 7, wherein the calibration module further functions to:
determine whether the measured received signal strength is greater than the desired zero-input input signal strength value;
when the measured received signal strength is greater than the desired zero-input signal strength value, scale up values in the received signal strength to power level table; and
when the measured received signal strength is less than the desired zero-input signal strength value, scale down values in the received signal strength to power level table.

* * * * *